United States Patent [19]

Martin

[11] 4,444,410
[45] Apr. 24, 1984

[54] BALL HITCH APPARATUS

[75] Inventor: E. Joel Martin, Westmont, Ill.

[73] Assignee: Sperry Corporation, New Holland, Pa.

[21] Appl. No.: 350,693

[22] Filed: Feb. 22, 1982

Related U.S. Application Data

[63] Continuation of Ser. No. 191,043, Sep. 25, 1980, abandoned.

[51] Int. Cl.³ .............................................. B60D 1/06
[52] U.S. Cl. .................................... 280/512; 280/511
[58] Field of Search ................ 280/507, 511, 512, 513

[56] References Cited

U.S. PATENT DOCUMENTS

| | | | |
|---|---|---|---|
| 195,025 | 9/1877 | Lane | 280/511 |
| 2,130,100 | 9/1938 | Rasmussen | 280/511 |
| 2,167,520 | 7/1939 | Mantle | 280/511 |
| 2,498,776 | 2/1950 | Weiss | 280/511 |
| 2,768,839 | 10/1956 | Riemann | 280/511 |
| 3,079,183 | 2/1963 | Melton et al. | 403/125 |
| 3,492,024 | 1/1970 | Cooper | 280/511 |
| 3,647,244 | 3/1972 | Hollis | 280/512 |

FOREIGN PATENT DOCUMENTS

| | | | |
|---|---|---|---|
| 2210731 | 12/1974 | France | 280/511 |
| 308084 | 3/1933 | Italy | 280/511 |
| 374065 | 5/1932 | United Kingdom | 280/511 |

Primary Examiner—Joseph F. Peters, Jr.
Assistant Examiner—Donn McGiehan
Attorney, Agent, or Firm—Darrell F. Marquette; Frank A. Seemar; Larry W. Miller

[57] ABSTRACT

A ball hitch apparatus is provided for connecting a towing and a towed vehicle. The hitch provides a durable, snug socket to ball connection which is capable of fast hookup without tools and is particularly useful with construction or farm machinery. The hitch includes a lever connected for pivoting an eccentric cam into position for maintaining a ball in a socket. A resiliently urged locking device automatically secures the lever. The locking device can be manually released to permit lever movement to a disconnect position.

5 Claims, 3 Drawing Figures

U.S. Patent — Apr. 24, 1984 — 4,444,410

BALL HITCH APPARATUS

This is a continuation of application Ser. No. 191,043, filed Sept. 25, 1980 now abandoned.

BACKGROUND OF THE INVENTION

This invention relates generally to land vehicles of the wheels, articulated type and, more particularly, to those having ball and socket type couplings.

Ball and socket couplings generally include a portion attached to a vehicle to be towed. This portion includes a socket-like receptacle. Another portion is attached to a towing vehicle and includes a ball. The ball and socket are of a construction sufficient for mating engagement.

For coupling, the ball is mounted in the socket and a securing device of some type is brought into a position sufficient for maintaining the ball in the socket but permitting movement of the ball within the socket.

Such couplings are very useful for accomplishing relatively quick connect-quick disconnect of construction and farming machinery. Thus it is important that coupling apparatus used with construction and farming machinery be rugged, provide a snug, secure socket to ball connection and which is relatively simple providing fast hookup without tools.

In the past, ball and socket connections which are rugged and durable are usually limited in that they are complex and slow fitting. Other connections which are quick fitting are usually limited in that they are not substantially built for strenuous use associated with farming and construction.

The foregoing illustrates limitations of the known prior art. Thus, it is apparent that it would be advantageous to provide an alternative directed to overcoming one or more of the limitations as set forth above.

SUMMARY OF THE INVENTION

In one aspect of the present invention, this is accomplished by providing a ball hitch apparatus including a ball receiving member including a socket. A pin is pivotally mounted in the ball receiving member adjacent the socket. A cam is eccentrically connected to the pin. A lever is provided for moving the cam into position for maintaining a ball in the socket. A lock is resiliently urged outwardly from the member for locking the lever when the cam is in position for maintaining the ball in the socket.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DETAILED DESCRIPTION OF THE PREFERRED EMBODIMENT

Figure 1:
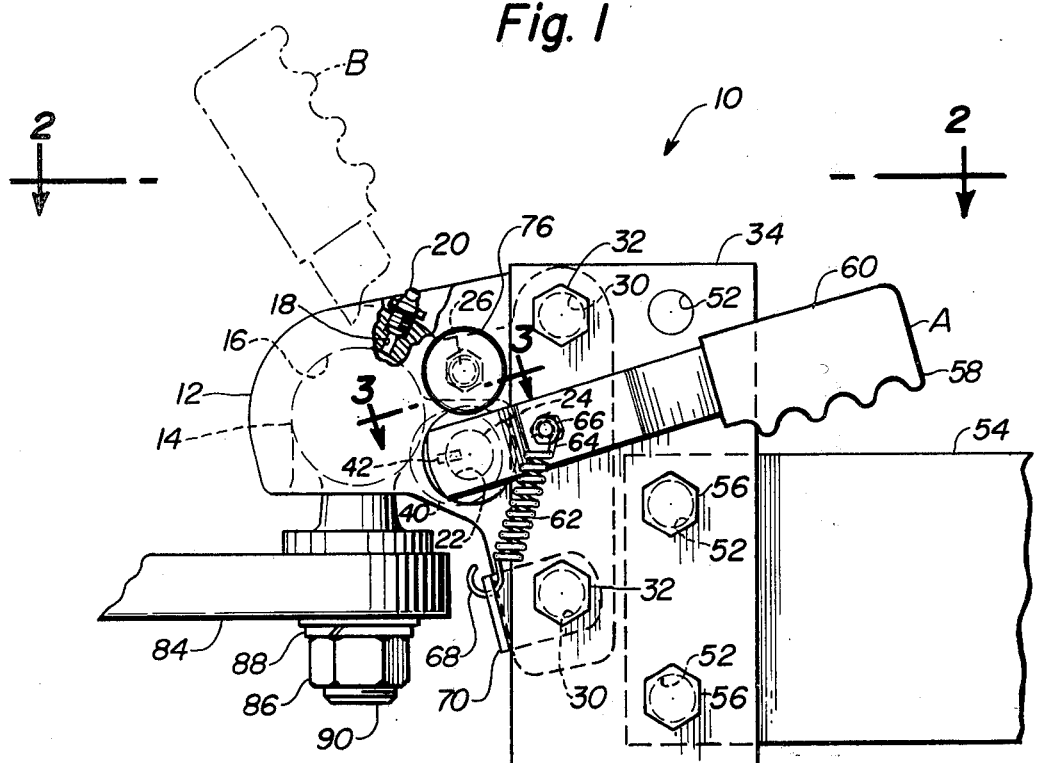
FIG. 1 is a side elevational view illustrating the ball hitch apparatus of this invention.

The ball hitch apparatus of this invention is generally designated 10 in FIG. 1 and includes means such as member 12 provided for receiving a ball portion 14 of a hitch. Member 12 generally has a ball socket 16 formed therein.

A lubricating port 18 is formed in member 12 and a self-tapping lube fitting 20 is secured in port 18. In this manner, socket 16 can receive lubrication when ball 14 is secured therein.

Figure 2:
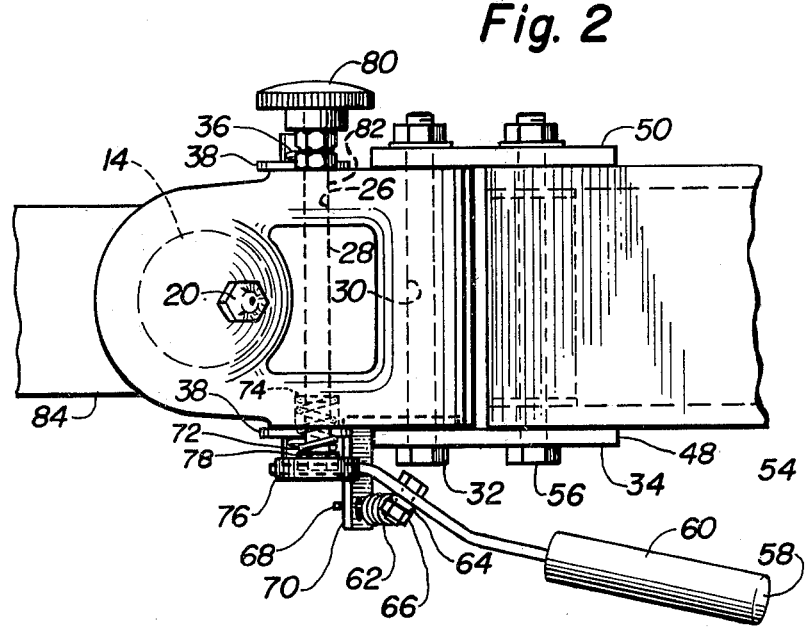
FIG. 2 is a top view illustrating the ball hitch as seen from line II—II of FIG. 1.

A plurality of bores, FIGS. 1 and 2, are machined in member 12. One of these bores 22 is adjacent socket 16 for receiving a pivot pin 24, another bore 26 is for receiving a resiliently urged locking pin 28, and other bores designated 30 are for receiving bolts 32 for securing member 12 to a support 34.

Figure 3:
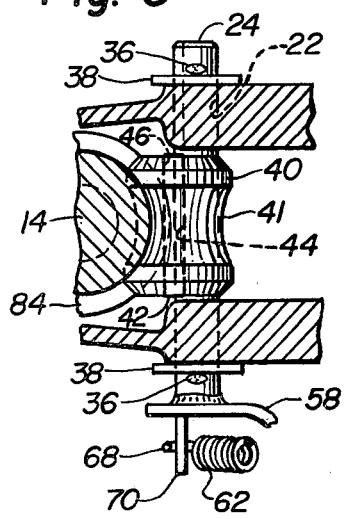
FIG. 3 is a partial top view illustrating the eccentric cam-ball engagement as seen from line III—III of FIG. 1.

Pivot pin 24 is inserted in bore 22 and is secured by cotter pins 36 engaging washers 38, see FIG. 3. A spool-like cam 40 includes a concave surface portion 41 for mating engagement with the convex surface of ball 16. Cam 40 is eccentrically mounted on pin 24 and is fixedly secured by means of a key 42 partially inserted into a groove 44 in pin 24 and partially inserted into a groove 46 in cam 40. In this manner, pivoting the pin 24 will also pivot cam 40.

Support 34, FIGS. 1 and 2, includes two parallel plates 48,50. Member 12 is secured between plates 48,50 by bolts 32 spaced apart to limit relative movement between member 12 and support 34. Support 34 is provided with a plurality of bores 52 for adjustably mounting support 34 on a tongue portion 54 of a towed member by means of bolts 56.

Means such as a lever 58 is provided for pivoting cam 40 to a first position A (as shown in solid line in FIG. 1) for maintaining associated ball 14 in socket 16. Lever 58 is also provided for pivoting to a second position B (as shown in dotted line in FIG. 1) for releasing ball 14 from socket 16. Lever 58 is thus fixedly attached to pivot pin 24 in a well known manner such as by welding or the like.

A suitable tension spring 62 is preferably connected at a first end 64 to lever 58 by means of a bolt 66, and is connected at a second end 68 to a flange 70 retained between plate 48 and member 12 by bolt 32. In this manner, tension supplied by spring 62 limits free play of lever 58. Preferably a hand grip 60 of suitable rubber or a synthetic material is provided on lever 58 for manual comfort.

Means such as resiliently urged locking pin 28 is provided for maintaining lever 58 in position A. Pin 28 is resiliently urged to extend from member 12 by a spring 72 seated in a counterbore 74, FIG. 2. A locking disc 76 is secured to a first end 78 of pin 28 and a manual knob 80 is secured to a second end 82 of pin 28. Spring 72 is compressed between counterbore 74 and disc 76. Disc 76 is of a construction sufficient for automatically snapping into a locking position in pivot limiting engagement with lever 58 when lever 58 is in position A. In this manner, cam 40 maintains ball 14 in socket 16. Movement of pin 28 due to manually urging knob 80 so that disc 76 compresses spring 72 into counterbore 74, permits lever 58 to be pivoted toward position B thus releasing ball 14 from socket 16. Ball 14 is secured to a drawbar portion 84 of a towing vehicle. Such securing is accomplished in the well known manner by a nut 86 and a lock washer 88 secured to a threaded extension 90 of ball 14.

Materials used for making all components of the ball hitch apparatus of this invention are well known suitable steel alloys. However, it is anticipated that material substitution, assembly and manufacturing methods may be varied if desired.

With the parts assembled as set forth above and with lever 58 in position B, ball 14 is placed into mating engagement with socket 16. Lever 58 is then manually pivoted into position A so that cam 40 is urged into engagement with ball 14. Spring 72 automatically urges disc 76 into a locking or pivot limiting engagement with lever 58. Thus, ball 14 is secured in socket 16. If desired, a suitable lubricant can be introduced into socket 16 via lub fitting 20.

When uncoupling is desired, knob 80 is manually urged to compress spring 72 in counterbore 74 until disc 76 is moved a sufficient distance for freeing lever 59 to pivot from position A toward position B. In this manner, cam 40 is pivoted out of engagement with ball 14 so that ball 14 can be removed from socket 16. Disc 76 is and remains urged against lever 58 poised for automatically snapping into a locking position when lever 58 is again pivoted to position A.

The foregoing has described a durable quick connect quick disconnect ball hitch suitable for use with farming and construction machinery and constructed for manual operation without the need for tools.

It is anticipated that aspects of the present invention, other than those specifically defined in the appended claims, can be obtained from the foregoing description and the drawings.

Having thus described the invention, what is claimed is:

1. A ball hitch apparatus comprising:
   means for receiving a ball portion of a hitch, said means including a member having a ball socket formed therein;
   a first pin pivotally mounted in said member adjacent said socket;
   a cam eccentrically connected to said first pin;
   means for pivoting said cam to a first position into engagement with an associated ball in said socket and to a second position free of engagement with said ball, said means being a lever carried by said first pin;
   means for maintaining said lever in said first position, said means being a second pin resiliently urged against said lever for automatically extending from said member into pivot limiting engagement with said lever in response to said lever being moved to said first position; and
   means for manually moving said second pin out of pivot limiting engagement with said lever.

2. The apparatus of claim 1 including:
   means for resiliently interconnecting said lever and said member.

3. The apparatus of claim 1 including:
   a lubricating port in said member adjacent said socket.

4. The apparatus of claim 1 wherein said cam is fixedly connected to said first pin.

5. The apparatus of claim 1 including:
   a locking disc connected to a first end of said second pin urged into engagement with said lever; and
   a knob connected to a second end of said second pin, said knob being said means for manually moving said second pin.

* * * * *